(12) United States Patent
Silver

(10) Patent No.: US 6,188,525 B1
(45) Date of Patent: Feb. 13, 2001

(54) VARIABLE FOCUS LENSES

(76) Inventor: Joshua D Silver, 61 Hurst Rise Road, Oxford OX2 9HE (GB)

(*) Notice: Under 35 U.S.C. 154(b), the term of this patent shall be extended for 0 days.

(21) Appl. No.: 09/254,848

(22) PCT Filed: Sep. 9, 1997

(86) PCT No.: PCT/GB97/02427

§ 371 Date: Jan. 15, 1999

§ 102(e) Date: Jan. 15, 1999

(87) PCT Pub. No.: WO98/11458

PCT Pub. Date: Mar. 19, 1998

(30) Foreign Application Priority Data

Sep. 13, 1996 (GB) ................................................ 9619198

(51) Int. Cl.$^7$ ................................................ G02F 1/1335
(52) U.S. Cl. ........................................ 359/666; 359/665
(58) Field of Search ..................................... 359/666, 665

(56) References Cited

U.S. PATENT DOCUMENTS

| | | | | |
|---|---|---|---|---|
| 4,236,629 | * | 12/1980 | Dwinell | 222/529 |
| 4,913,536 | * | 4/1990 | Barnea | 350/419 |
| 5,233,470 | * | 8/1993 | Wu | 359/666 |
| 5,684,637 | * | 11/1997 | Floyd | 359/666 |
| 5,774,274 | * | 6/1998 | Schachar | 359/666 |
| 5,951,193 | * | 9/1999 | Yamamoto et al. | 403/154 |
| 5,956,183 | * | 9/1999 | Epstein et al. | 359/666 |
| 5,963,293 | * | 10/1999 | Jannard | 351/45 |
| 5,971,916 | * | 10/1999 | Koren | 600/122 |

\* cited by examiner

*Primary Examiner*—Georgia Epps
*Assistant Examiner*—Tim Thompson
(74) *Attorney, Agent, or Firm*—Sughrue, Mion, Zinn, Macpeak & Seas, PLLC

(57) ABSTRACT

A variable focus lens comprises first and second transparent, flexible membranes (2) which are tensioned and which define a cavity (30) in which a transparent, silicone oil (4) is sealed. Adjustment of the pressure or volume of the oil in the cavity changes the focal length of the lens. To fabricate the lens, the periphery of each membrane (2) is engaged between two rings (8, 10; 10, 12) of a set of three interengaging rings (8, 10, 12). The interengaged rings are crimped together to tension the membranes (2) and seal the cavity (30).

16 Claims, 1 Drawing Sheet

VARIABLE FOCUS LENSES

BACKGROUND OF THE INVENTION

1. Field of the Invention

The present invention relates to a method of fabricating a variable focus lens and to the variable focus lens so constructed.

2. Related Art

It is known to provide a variable focus lens in which one or more transparent flexible membranes are tensioned to define a cavity therebetween in which a transparent fluid is received. Adjustment of the pressure and/or volume of the fluid in the cavity causes variations in the shape of the membranes, and the structure defines a lens of variable focal length.

However, whilst it is known to use such a construction to provide a variable focus lens, no current proposals for fabricating such a lens provide a lightweight structure which can easily be incorporated into spectacles, for example.

The present invention seeks to provide a new method of fabricating a variable focus lens and to provide a new structure for such a lens.

SUMMARY OF THE INVENTION

According to a first aspect of the present invention there is provided a method of fabricating a variable focus lens comprising the steps of interengaging first and second rings to engage a first transparent, flexible membrane and to retain said first flexible membrane across the first ring, interengaging a third ring with said first and second rings to engage a second transparent, flexible membrane and to retain said second flexible membrane across the first ring, whereby the first and second flexible membranes define a cavity therebetween, and holding said first, second and third rings together such that said first and second flexible membranes are each tensioned across said first ring.

A method of an embodiment of the invention enables a variable focus lens to be assembled quickly and easily.

A transparent fluid is to be sealed within the cavity defined between the two flexible membranes. In an embodiment, a duct is provided through said rings, which duct is in communication with said cavity. The duct may be formed from pre-formed bores in said first, second and third rings. However, in a preferred embodiment, said duct is drilled, or otherwise formed, through said rings.

In an embodiment said first ring receives said second and third rings therein and defines the periphery of a peripheral, annular frame for the lens, which annular frame is defined by said first, second and third rings. This annular frame may readily be supported within lens apertures provided in spectacles, for example.

The peripheral shape of the peripheral annular frame, and hence of the individual rings, may be chosen as is required. For example, the annular frame may have a circular, oval, elliptical, or other closed curve, peripheral shape.

Any method for holding the first, second and third rings together to retain the flexible membranes under tension may be used.

In a preferred embodiment, the method further comprises turning, crimping or otherwise deforming the first ring so that the second and third rings are retained within said first ring.

Additionally and/or alternatively, said annular frame may be retained within the frame of a pair of spectacles. In this case, the frame of the spectacles may act to hold the first, second and third rings together. Of course, any other retaining means may additionally and/or alternatively be provided to secure the first, second and third rings in their interengaged position.

According to a further aspect of the present invention there is provided a variable focus lens having a cavity containing a transparent fluid defined between first and second transparent, flexible membranes, wherein each of said first and second flexible membranes is tensioned across and held by a peripheral annular frame, and wherein said annular frame is formed from first, second and third interengaged rings, said first ring receiving the second and third rings therein and defining the periphery of said annular frame.

A variable focus lens of an embodiment of the invention is simple and relatively inexpensive to assemble. Furthermore, the lens may be supported readily within the lens aperture in a pair of spectacles, for example.

The peripheral shape of the peripheral annular frame, and hence of the individual rings, may be chosen as is required. For example, the annular frame may have a circular, oval, elliptical, or other closed curve, peripheral shape.

Any method for holding the first, second and third rings together to retain the flexible membranes under tension may be used.

In an embodiment, the annular frame is arranged to be retained within the frame of a pair of spectacles. In this case, the frame of the spectacles may act to hold the first, second and third rings together. Of course, any other retaining means may additionally and/or alternatively be provided to secure the first, second and third rings in their interengaged position.

It is important that the transparent fluid within said cavity cannot leak. Accordingly, it is preferred that the interengagements between said rings cause the periphery of an appropriate flexible membrane to change direction more than once. This aids in sealing the periphery of the cavity.

It would be possible to construct the lens from a single flexible membrane web appropriately arranged to define two flexible membranes. However, in a preferred embodiment, two separate flexible membranes are provided with the periphery of the first flexible membrane being held by the interengagement of the first and second rings, and the periphery of the second flexible membrane being held by the interengagement of the second and third rings. This provides a simple, yet effective sealed structure for the cavity.

Each of said first and second membranes has a continuous periphery which is held by the respective rings so that it is bent to change direction more than once.

Preferably, each of two adjacent rings has a complementary annular step therein for interengaging the two rings, said interengaged steps also guiding an interposed flexible membrane around two direction changes.

In a preferred embodiment, each of said first and second flexible membranes is of high grade Mylar.

The first, second and third rings may be of any suitable material. Preferably, each of the rings is of a material which is sufficiently rigid to positively interengage with the adjacent ring and to ensure that two interengaged rings can maintain the flexible membrane under tension. The material of the rings is also required to be lightweight to facilitate the incorporation of lenses of the invention in spectacles. Thus, the rings may be made, for example, of a high impact resistant plastics material, or of aluminium, or of titanium.

The transparent fluid retained within the cavity may be any suitable fluid. In a preferred embodiment, the fluid is a silicone oil, for example, an oil of the silicone 703 type.

In a preferred embodiment, the lens is additionally provided with two spaced, substantially parallel sheets of transparent polycarbonate between which the cavity defined by the flexible membranes is arranged. The polycarbonate sheets provide protection to the flexible membranes and are readily tinted, for example, if required. The annular frame may also be received between the polycarbonate sheets if required.

BRIEF DESCRIPTION OF THE DRAWINGS

Embodiments of the present invention will hereinafter be described, by way of example, with reference to the accompanying drawings, in which.

DETAILED DESCRIPTION OF THE PREFERRED EMBODIMENT

The lens described and illustrated herein may be utilised in an optical apparatus constructed and arranged to be adjusted as described and claimed in International application No. WO 96/38744.

Figure 2:
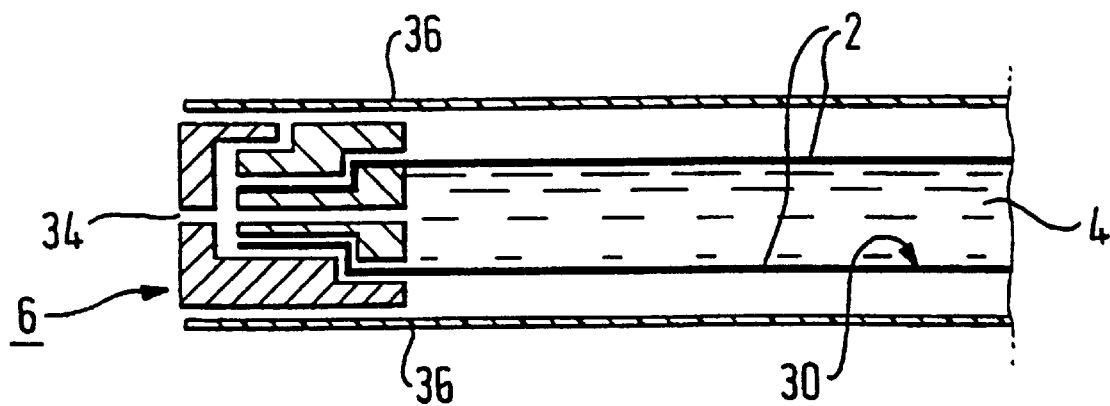
FIG. 2 shows a section similar to that of FIG. 1 but showing the completed lens.

The lens shown in FIG. 2 comprises first and second transparent, flexible membranes 2 which are tensioned and which define therebetween a cavity 30 in which a transparent fluid 4, such as silicone oil, is contained. In the embodiment illustrated the membranes 2 are of Mylar, for example, 23 μm Type D Mylar.

The membranes 2 are held in tension by way of a peripheral annular frame 6. The frame 6 defines the periphery of the lens, and of the cavity 30, and is arranged to hold the flexible membranes 2 under tension. The frame 6 is also arranged to seal the lens.

Figure 1:
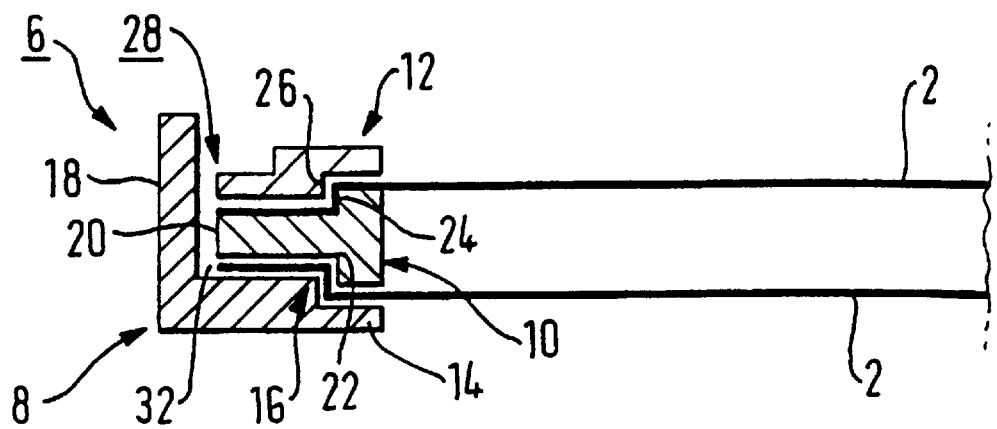
FIG. 1 shows an axial section of a portion of a variable focus lens of the invention during construction thereof.

As can be seen from FIG. 1, the annular frame 6 is formed by interengaging first, second and third rings 8, 10, 12 of aluminium. In this respect, the first ring 8 has a radially extending flange 14 which is stepped as indicated at 16. The first ring 8 also has an axially extending rim 18. The second ring 10 has a radially outwardly projecting portion 20 defining a first step 22 which cooperates with the step 16 of the first ring 8 and a second step 24 which cooperates with a step 26 of the third ring 12. The third ring 12 has a recess 28 arranged radially outwardly therein.

Where the completed lens is to have a generally circular periphery, for example, a first membrane 2, which is circular, is positioned to extend within the first ring 8 such that its periphery extends along the radial flange 14 thereof. The second ring 10 is then supported within the first ring 8 such that the complementary steps 16 and 22 thereof interengage. This interengagement positions the second ring 10 relative to the first ring 8. The interengagement also bends the peripheral circumference of the first membrane 2 through two different directions as is clearly shown in FIG. 1.

A second circular membrane 2 is then positioned across the first ring 8 such that its periphery extends along the upper radially extending surface of the second ring 10. Thereafter, the third ring 12 is positioned such that the steps 24 and 26 of the second and third rings 10, 12 cooperate to retain the third ring 12 in position within the first ring 8, and to bend the periphery of the second membrane 2 through two directions. The tolerances of the three rings 8, 10, 12 are chosen such that even when the arrangement is in the interengaged position shown in FIG. 1, the two membranes 2 are firmly held by the interengaged rings.

The construction has the considerable advantage that the circular membranes 2 do not have to be produced to close tolerances. Each circular membrane 2 can be cut to be generally circular and to have a diameter which is somewhat larger than is required. In its turn, each membrane 2 is positioned as described above and held by the interengagement of the corresponding ring 10, 12. Any excess material of the membrane 2 can then be trimmed simply using a knife with the rings 10, 12 acting as guides.

To complete the construction of the lens it is necessary to ensure that the three rings 8, 10, 12 are secured together such that the peripheries of the membranes 2 are firmly retained to seal the lens and to prevent any leakage from the cavity 30 defined between the two membranes 2. In the embodiment illustrated, the retention of the membranes 2 is achieved by crimping and deforming the first ring 8. In this respect, the upstanding, axially extending, free end of the limb 18 of the first ring 8 is bent over to be received within the recess 28 of the third ring 12. Any excess material deformed from the ring 8 during this crimping operation is received within an annular space 32 which is defined between the radially outwardly peripheries of the second and third rings 10 and 12, and the inner periphery of the limb 18 of the first ring 8.

Once the lens has been constructed, as shown in FIG. 1, and with the outer ring 8 deformed to secure the structure, a duct 34 is drilled through the frame 6 into the cavity 30. The cavity 30 can then be filled with the transparent fluid 4 through the duct 34. With 703 silicone oil as the fluid the resultant lens achieves a focal length range of at least −6 to +10 dioptres, and the range −10 to +10 dioptres should be achievable.

Fluid may be introduced into the cavity 30 by way of the duct 34 and retained therein by use, for example, of ducts, plugs and sealing means as described in International application No. WO 96/38744. In an embodiment, the lens is pre-filled at this stage with the fluid 4 and an appropriate material is provided in the duct 34 to seal the cavity 30. However, the material sealing the duct 34 is preferably penetrable by a syringe, for example, so that the pressure of the fluid 4 within the cavity 30 can be adjusted.

In the embodiment shown, the two axially outer surfaces of the lens are each protected by a sheet 36 of a polycarbonate. Each polycarbonate sheet 36, for example, may be about ½ millimeter thick. It will be appreciated that these sheets 36 are arranged to extend substantially parallel to each other. The circumferential periphery of each of the sheets 36 may be fixed to the annular frame 6 in any appropriate manner. For example, the sheets 36 may be adhered to the frame 6. Additionally and/or alternatively, a plastics material frame (not shown) of a pair of spectacles, for example, may be arranged to receive the annular frame 6 in a manner to retain the sheets 36 against the annular frame 6 in the position of FIG. 2.

It will be appreciated that alterations and modifications may be made to the embodiments described and illustrated herein within the scope of this application.

What is claimed is:

1. A method of fabricating a variable focus lens comprising the steps of:
   providing a first ring;
   interengaging second and third rings to engage a first transparent, flexible membrane and to retain said first flexible membrane across the second ring, said interengagement of said second and said third ring causing tension over said first flexible membrane before insertion of a fluid;

interengaging said first ring with said second and third rings to engage a second transparent, flexible membrane and to retain said second flexible membrane across the second ring, said interengagement of said first and said second ring causing tension over said second transparent membrane, whereby said first and said second flexible membranes define a cavity therebetween; and holding said first, said second and said third rings together such that said first and said second flexible membranes are each tensioned across said second ring.

2. A method as claimed in claim 1, further comprising the steps of providing a duct through said rings, which duct is in communication with said cavity and filling a transparent fluid into said cavity through said duct.

3. A method as claimed in claim 2, wherein said duct is formed through said rings.

4. A method as claimed in claim 2 or 3, wherein said first ring receives said second and third rings therein and defines the periphery of a peripheral, annular frame for the lens, which annular frame is defined by said first, second and third rings.

5. A variable focus lens comprising:

a cavity containing a transparent fluid defined between a first and a second transparent flexible membrane, wherein each of said first and said second flexible membranes is tensioned across and held by a peripheral annular frame, said annular frame being formed from first, second and third interengaged rings, said first ring receiving the second and third rings therein and defining a periphery of said annular frame, wherein the interengagement of said second and said third ring causes tension over said first flexible membrane before insertion of a fluid and the interengagement of said first and said second ring causes tension over said second transparent membrane.

6. A variable focus lens as claimed in claim 5, wherein the annular frame has a closed curve, peripheral shape.

7. A variable focus lens as claimed in claim 5, wherein said first, second and third rings are held together to retain the flexible membranes under tension and to seal said cavity.

8. A variable focus lens as claimed in any of claim 5, wherein two separate flexible membranes are provided, with the periphery of the first flexible membrane being held by the interengagement of the first and second rings, and the periphery of the second flexible membrane being held by the interengagement of the second and third rings.

9. A variable focus lens as claimed in any of claim 5, wherein each of said first and second flexible membranes is of high grade Mylar.

10. A variable focus lens as claimed in any of claim 5, wherein each of the rings is of a material which is sufficiently rigid to positively interengage with the adjacent ring and to ensure that two interengaged rings can maintain the flexible membrane under tension.

11. A variable focus lens as claimed in claim 10, wherein the rings are made of one of a high impact resistant plastics material, aluminium, or titanium.

12. A variable focus lens as claimed in any of claim 5, wherein the transparent fluid retained within the cavity is a silicone oil.

13. A variable focus lens as claimed in any of claim 5, wherein the lens is additionally provided with two spaced, substantially parallel sheets of transparent polycarbonate between which the cavity defined by the flexible membranes is arranged.

14. A pair of spectacles comprising:

a first and a second transparent flexible membrane;

a transparent fluid;

at least one cavity defined by the first and the second flexible membranes, said cavity containing the transparent fluid; and a peripheral annular frame for holding the first and second transparent flexible membranes, said peripheral annular frame being formed from first, second and third interengaged rings, said first ring receiving the second and third rings therein and defining the periphery of the annular frame.

15. A method of fabricating a variable focus lens comprising the steps of:

providing a first ring;

interengaging second and third rings to engage a first transparent, flexible membrane and to retain said first flexible membrane across the second ring;

interengaging said first ring with said second and third rings to engage a second transparent, flexible membrane and to retain said second flexible membrane across the second ring, whereby the first and second flexible membranes define a cavity therebetween;

holding said first, second and third rings together such that said first and second flexible membranes are each tensioned across said second ring; and turning, crimping or otherwise deforming the first ring so that the second and third rings are retained within said first ring.

16. A variable focus lens comprising:

a cavity containing a transparent fluid defined between a first and a second transparent flexible membrane, wherein each of said first and second flexible membranes is tensioned across and held by a peripheral annular frame, said annular frame being formed from first, second and third interengaged rings, said interengaged rings causing the periphery of said transparent flexible membrane to change direction more than once, said first ring receiving the second and third rings therein and defining the periphery of said annular frame.

* * * * *